(12) United States Patent
DuQuette et al.

(10) Patent No.: US 10,262,550 B2
(45) Date of Patent: Apr. 16, 2019

(54) DYNAMIC FEEDBACK AND SCORING OF TRANSCRIPTION OF A DICTATION

(71) Applicants: John Nicholas DuQuette, New York, NY (US); Samuel Lazarus, New York, NY (US)

(72) Inventors: John Nicholas DuQuette, New York, NY (US); Samuel Lazarus, New York, NY (US)

(*) Notice: Subject to any disclaimer, the term of this patent is extended or adjusted under 35 U.S.C. 154(b) by 107 days.

(21) Appl. No.: 15/191,710

(22) Filed: Jun. 24, 2016

(65) Prior Publication Data

US 2016/0379513 A1 Dec. 29, 2016

Related U.S. Application Data

(60) Provisional application No. 62/185,252, filed on Jun. 26, 2015.

(51) Int. Cl.
*G09B 13/00* (2006.01)
*G09B 5/06* (2006.01)

(52) U.S. Cl.
CPC .............. *G09B 13/00* (2013.01); *G09B 5/065* (2013.01)

(58) Field of Classification Search
CPC ................................ G09B 11/00; G09B 13/00
See application file for complete search history.

(56) References Cited

U.S. PATENT DOCUMENTS

| | | | |
|---|---|---|---|
| 4,690,644 A * | 9/1987 | Flanders | G09B 11/08 434/158 |
| 5,689,585 A * | 11/1997 | Bloomberg | G06K 9/00469 382/229 |
| 5,885,083 A | 3/1999 | Ferrell | |
| 6,341,959 B1 | 1/2002 | Wen et al. | |
| 6,726,486 B2 | 4/2004 | Budra et al. | |
| 2006/0292529 A1 | 12/2006 | Logan et al. | |
| 2011/0087491 A1* | 4/2011 | Wittenstein | G10L 15/26 704/235 |
| 2013/0177891 A1 | 7/2013 | Hammerschmidt | |

* cited by examiner

*Primary Examiner* — James S. McClellan
(74) *Attorney, Agent, or Firm* — Luis Figarella

(57) ABSTRACT

An automated system and method for transcription of a dictation presents a transcription exercise to a student that allows continuous student keyboarding of text while providing real time feedback of correct, incorrect, and misplaced characters as well as visually pointing out the location of missing letters and missing words. The real time designation is shown using differences in typeface style or color and using a scoring system that factors in substantially all keystrokes. Not only is final correctness assessed, but also the difficulty in getting to the final state of correctness is assessed.

22 Claims, 3 Drawing Sheets

DYNAMIC FEEDBACK AND SCORING OF TRANSCRIPTION OF A DICTATION

CROSS-REFERENCE TO RELATED APPLICATIONS

This application claims priority to U.S. Provisional patent application Ser. No. 62/185,252 titled "Dynamic Feedback and Scoring of Transcription of a Dictation", filed on Jun. 26, 2015 the disclosure of which is herein incorporated by reference in its entirety.

PATENTS CITED

The following documents and references are incorporated by reference in their entirety, Hammerschmidt (US Pat. Pub. No. 2013/0177891).

FIELD OF THE INVENTION

The presently disclosed subject matter relates to educational systems and methods for transcription of a dictation, more particularly to education systems and methods for languages and literacy.

DESCRIPTION OF THE RELATED ART

Dictation has long been used in the language learning classroom. A teacher reads a passage aloud and the student must write down what is heard to the best of their ability. The teacher may repeat the passage more than once. The student's transcription is then presented to the teacher for correction, or a correct transcription is shown to the student for self-correction. Dictation exercises have been adapted to computer-assisted learning. For example, existing systems present a dictation exercise via audio files. In a typical scenario the student is presented with an audio passage and asked to type in a transcription. In some systems the student can listen to the passage as many times as they want. Once the student feels they have transcribed the passage to the best of their ability by typing on a computer keyboard, they press the "check" button and are presented with feedback that compares their answer with the correct answer.

A response of a current system might be to display the graded text in a feedback window to the student with correct and incorrect text in different fonts, font sizes or letter colors. Correctly entered words might be shown as regular black script. Incorrectly entered words (including misspelled versions of the required words) might be shown as italicized blue superscript with a superimposed strikethrough. Correctly spelled words missing from the user input might be shown, inserted into the correct position in the sentence, as red and italicized. This system does not give the student "real time" feedback that allows them to adjust their answer as they work. Further, once feedback is given, it fully reveals the right answer; a preferable method would be to display where the student is correct and where they have erred, allowing them to continue engagement with the exercise, and to continue making adjustments as they strive for a perfect transcription. In other words, the system does not give the student an opportunity to correct their work in an incremental manner.

At least one, newer, more sophisticated system does provide dynamic feedback as the student types. One way this is done is to start by showing the user a series of input boxes corresponding to the transcription phrase, one box per word, with the box length being a hint as to the number of letters in the respective word. Once a student types in a word correctly, they are automatically taken to the next input box where they can continue typing. As the student types, they are given immediate feedback in the form of color-coding. An incorrect letter (one not found in the word) turns red, indicating that it is completely wrong. A correct letter in the correct position is displayed as green, indicating that it is fully correct, and a correct letter (one found in the word) placed in an incorrect position is displayed as orange, and it is said to be ½ correct. Students can continue working within a single input box until all necessary letters are presented in the correct order—at which point all the letters might turn from green to black, the input box may become locked against further input, and the cursor might jump to the next empty input box.

This type of system does guide the student with instant feedback. It also guides a student whose spelling is not perfect, but who can nonetheless properly identify words and parts of speech. However, it does not provide for a natural input experience and therefore can be jarring and disruptive to the learning process. As soon as the user makes a mistake they are stopped in their tracks before they can continue on to the next word. Students may be able to skip a word or words, by skipping boxes using their mouse or touch screen, but to do so is not a natural way to transcribe. Furthermore, any intermediate work or feedback received on an incomplete and/or otherwise incorrect word can be lost when one moves to a different input box. This is awkward, unexpected interface behavior and also is not a natural way to transcribe.

In addition, the feature whereby an "incorrectly positioned" letter is marked as "½ correct" is actually problematic and confusing. For example, if the user misses an "f" in the word "difficult", so that it is input as "dificult"—then the letters "icult" after the "f" are colored orange, which indicates that they are "½ correct." But in fact the letter group "icult" is completely correct, these letters are in the proper sequence with relation to each other and with relation to the initial letters, "dif." The real problem is that a letter, the second "f," needs to be inserted after the letter group "dif" and before the letter group "icult."

This type of system fails to indicate when and where letters need to be inserted, and instead erroneously indicates correctly ordered letters falling after missing letters as wrong or partially wrong. Our invention solves this problem. Correctly sequenced letters in the proper relative positions with respect to other correct letters are always marked as correct, and the insertion points where letters are missing are always indicated. The same is true with words correctly placed in relation to each other and other correct words, as well as missing words.

In addition, the layout of hangman style input boxes unnecessarily gives away the number of words required and the relative length of each word as well. Such information can be a useful clue to assist the learner, but it is best to reserve such information as an extra and optional clue, depending on teacher's preference, or the student's desire and ability level.

Since dictation-to-transcription is a very important pedagogical tool and the type of errors a student might make on the way to a correct answer is vast, a method of interactive feedback that supports learning and performs scoring in a way that reflects the student's ability is required.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The disclosed dictation systems and methods solve these problems by providing a computer based transcription exercise that allows for uninterrupted input of contiguous words in a single input area without forcing the student to stop and correct spelling while listening. This is coupled with dynamic feedback that distinguishes correct words from incorrect words and also reveals insertion points indicating the location of missing words. Furthermore, incorrect words also display dynamic feedback that distinguishes incorrect letters from correct letters, taking into account proper relative position and sequence of characters, as well as revealing insertion points indicating the location of missing letters.

Once the student has included all necessary words, fixed all spelling errors, and omitted any unnecessary words, the system will indicate that this passage transcription is successfully completed. As the student works, the system records all student input, tracking any and all omissions, corrections, and the order of letter and word input. This data can be used to determine a score that measures how easy or how difficult it is for the student to transcribe the audio passage. When used as a test this score can be used to assess the student's ability, either for level assessment or for grading. When used for training purposes this score can be used to determine the challenge the passage presented to the student.

In one aspect the invention is about a dynamically scored dictation transcription system with dynamic feedback and scoring having at least one computer processor and associated memory, wherein said system comprises an audio playing module, an operator interface module providing a facility for the continuous tracking of entry of text by a user regardless of said text correctness; and a calculation module for performing a calculation that includes the real time display of said entered text as well as the display of various indicia designating correct letters, incorrect letters and missing letters and/or words in said entered text. In another aspect, said calculation module includes the calculation of the individual data elements of a grading event matrix calculation based upon the timeliness and accuracy factors of said user entered data and generating and/or updating the data elements of the exercise challenge score. In yet another aspect, said calculation module generates said exercise challenge score, including the values of each said individual data element of said grading event matrix, after every user character input.

In another aspect said individual data elements of said grading event matrix include at least one of: correct, missing, discontinuous, partial, revealed, number of keystrokes to completion, number of times the user repeated the audio, use of aids, use of hints and/or time to completion. In yet another aspect, correct letters that are in proper sequence with respect to each other and with respect to other correct letters are shown as correct in the feedback regardless of whether any preceding letters are missing or not. In another aspect, said calculation module generates said exercise challenge score, including the values of each said individual data element of said grading event matrix after every word input. In yet another aspect, said individual data elements of said grading event matrix include at least one of: correct, missing, discontinuous, partial, revealed, number of keystrokes to completion, number of times the user repeated the audio, use of aids, use of hints and/or time to completion. In another aspect, correct letters that are in proper sequence with respect to each other and with respect to other correct letters are shown as correct in the feedback regardless of whether any preceding letters are missing or not.

In one aspect, the invention is about a method for dynamically scored dictation transcription with dynamic feedback and scoring, the method being performed by at least one computer and associated memory, said method comprising, providing audio through a sound playing module, providing an operator interface module facility for the continuous tracking of entry of text by a user regardless of said text correctness and providing a calculation module for performing a calculation of the real time display of said entered text as well as the display of various indicia designating correct letters, incorrect letters and missing letters and/or words in said entered text. In another aspect, said calculation module includes the calculation of the individual data elements of a grading event matrix calculation based upon the timeliness and accuracy factors of said user entered data and generating and/or updating the data elements of the exercise challenge score. In yet another aspect, said calculation module generates said exercise challenge score, including the values of each said individual data element of said grading event matrix, after every user character input. In another aspect, said individual data elements of said grading event matrix include at least one of: correct, missing, discontinuous, partial, revealed, number of keystrokes to completion, number of times the user repeated the audio, use of aids, use of hints and/or time to completion.

In another aspect, correct letters that are in proper sequence with respect to each other and with respect to other correct letters are shown as correct in the feedback regardless of whether any preceding letters are missing or not. In yet another aspect, said calculation module generates said exercise challenge score, including the values of each said individual data element of said grading event matrix, after every user word input. In another aspect, said individual data elements of said grading event matrix include at least one of: correct, missing, discontinuous, partial, revealed, number of keystrokes to completion, number of times the user repeated the audio, use of aids, use of hints and/or time to completion. In yet another aspect, correct letters that are in proper sequence with respect to each other and with respect to other correct letters are shown as correct in the feedback regardless of whether any preceding letters are missing or not.

In one aspect, the invention is about a method of presenting a dictation transcription exercise, the method being performed by at least one computer and associated memory, said method comprising playing a pre-recorded audio passage, accepting text input, displaying the text input in real time with indicia of correct letters, incorrect letters, and the location of missing letters where the accepting of text input is not affected by erroneous transcription. In another aspect, said indicia includes characters of more than one color. In yet another aspect, the display of visual hints other than correct characters in the language of the exercise. In another aspect, said method also comprises recording as data all changes in text input and generating/updating an exercise challenge score based on such data upon the detection of any change in text input.

Other features and advantages of the present invention will become apparent upon examining the following detailed description of an embodiment thereof, taken in conjunction with the attached drawings.

Figure 1:
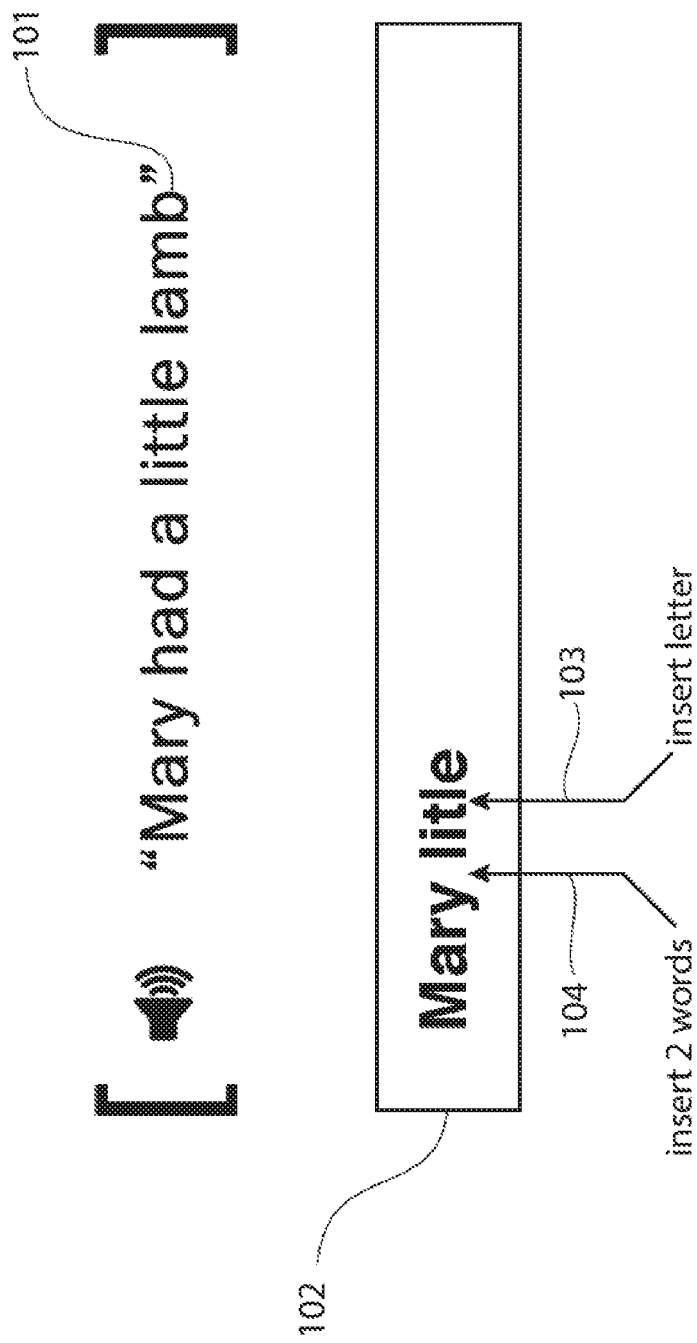
FIG. 1 depicts a display screen during a transcription exercise at a point when nine characters have been entered by a student (in these figures, a san serif font is used to represent green lettering and a serif font is used to represent red lettering in the depiction of screens), according to an exemplary embodiment of the invention.

The above-described and other features will be appreciated and understood by those skilled in the art from the following detailed description, drawings, and appended claims.

DETAILED DESCRIPTION OF THE PREFERRED EMBODIMENT

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

Simplifications or omissions may be made to avoid obscuring the purpose of the section. Such simplifications or omissions are not intended to limit the scope of the present invention. All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art.

As used in the specification and claims, the singular forms "a", "an" and "the" include plural references unless the context clearly dictates otherwise. For example, the term "a transaction" may include a plurality of transaction unless the context clearly dictates otherwise. As used in the specification and claims, singular names or types referenced include variations within the family of said name unless the context clearly dictates otherwise.

Certain terminology is used in the following description for convenience only and is not limiting. The words "lower," "upper," "bottom," "top," "front," "back," "left," "right" and "sides" designate directions in the drawings to which reference is made, but are not limiting with respect to the orientation in which the modules or any assembly of them may be used.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Referring to FIG. 1, we see a first embodiment of the method, depicted as an example of the proposed dictation exercise system and method. In this example the student is presented with the spoken audio "Mary had a little lamb" 101 and is asked to transcribe it. In a transcription box 102, which may be present in a personal device (such as a Tablet, Smartphone, Computer screen or similar), the student has successfully typed the first word, "Mary," has skipped the second and third words but has made an attempt to type the fourth word, "litle," which the student has mistakenly typed as having only one "t."

Dynamic feedback (performed by at least one computer processor and some memory) is in effect, in real time, as the student types (which includes swiping, touching or otherwise entering data on a physical or virtual keyboard). The system knows the correct characters to be entered, and by comparing the entered stream against the correct characters the system is then capable of determining if letters and/or words are correct, incorrect or misplaced, and further indicate where there exist gaps in the input of either individual letters or words. For example, the word "Mary" is completely correct and thus is colored completely green. Green is represented by bold sans serif letters in these figures. The string "litle" contains correct letters in correct relative position to each other, so these characters are all displayed as green on the user's screen as well. However, there is a letter missing, and the visual feedback indicates this fact by showing a labeled arrow 103 that indicates a letter needs to be inserted between the "t" and the "l". It is up to the student to keep working and figure out what letter it is. Likewise, the dynamic feedback shows the student that there are two words missing between "Mary" and "little" by a second labeled arrow 104.

In another embodiment, the feedback notation (103, 104) might simply indicate that at least one word or letter is missing without revealing precisely how many. In this embodiment, there is no indication that a word or words are missing after the last word input but in another embodiment missing terminal words might also be indicated. This might be particularly appropriate in certain circumstances, for example if the student has failed to input anything for some set period of time, for example 15 seconds. The notation used for feedback indicating missing letters or words could be stylized arrows without text labels, arrows of different colors, horizontal lines, or other graphic representation.

Figure 2:
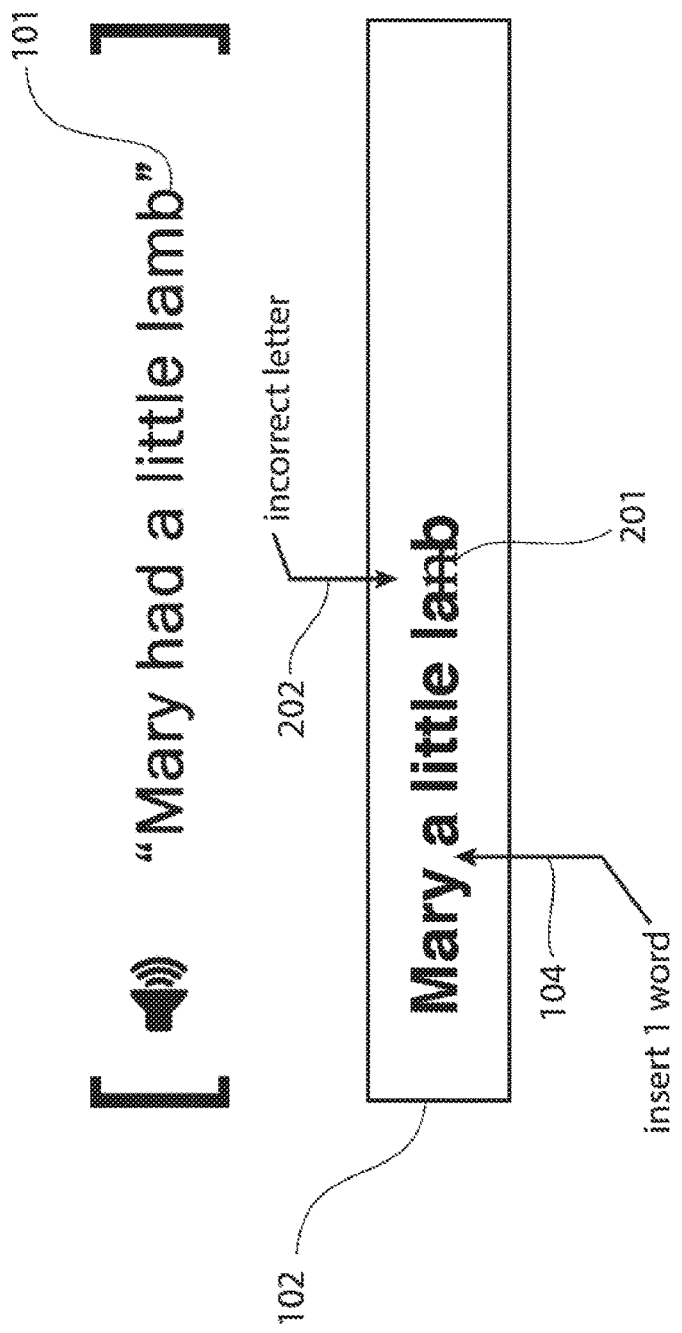
FIG. 2 depicts a display screen during the transcription exercise of FIG. 1, using the conventions of FIG. 1, at a point after the state shown in FIG. 1 where several more letters have been entered, according to an exemplary embodiment of the invention.

Referring to FIG. 2 we see a depiction of the same instance of the dictation exercise a short period of time later. At this point the student has successfully added the word "a" before the word "little," has successfully added the missing "t" in "litle", and has attempted to type the word "lamb," but has made an error, typing an "n" 201 in place of the "m". A serif font is used to indicate red type and it is displayed with a strikethrough. In this embodiment, dynamic feedback makes this error evident to the student, by styling the incorrect letter with a strikethrough and coloring the letter red on the user's screen. It is shown here in san serif type. Redundant feedback consisting of an arrow 202 with the text label "incorrect letter" is another option that might improve clarity. The word "had" is still missing, and so feedback 104 indicates that a word is still missing between "Mary" and "a". Once the student has included all necessary words, fixed all spelling errors, and omitted any unnecessary words, the system will indicate that this passage transcription is successfully completed.

As the student works, the system records all student input, tracking any and all omissions, corrections and the order of word input. Among other data the system might collect are: total time to completion; total corrections/errors before completion; number of times the media looped or was manually replayed; order in which words were input (in or out of proper sequence) student accessing of clues, hints; and also tools that make completion easier.

This data is used to determine an exercise challenge score that measures how easy or how difficult it was for the student to transcribe the audio passage correctly. When used as a test, this score can be used to assess the student's ability, either for level assessment or for grading. When used for training purposes, this exercise challenge score can be used to determine the challenge the passage presented to the student, and therefore determine future exercise scheduling. If the score indicates an extreme challenge, the system might choose an easier audio passage for the next exercise. If the score indicates a moderate challenge, the system might decide to present the same passage to the same student in the near future.

Figure 3:
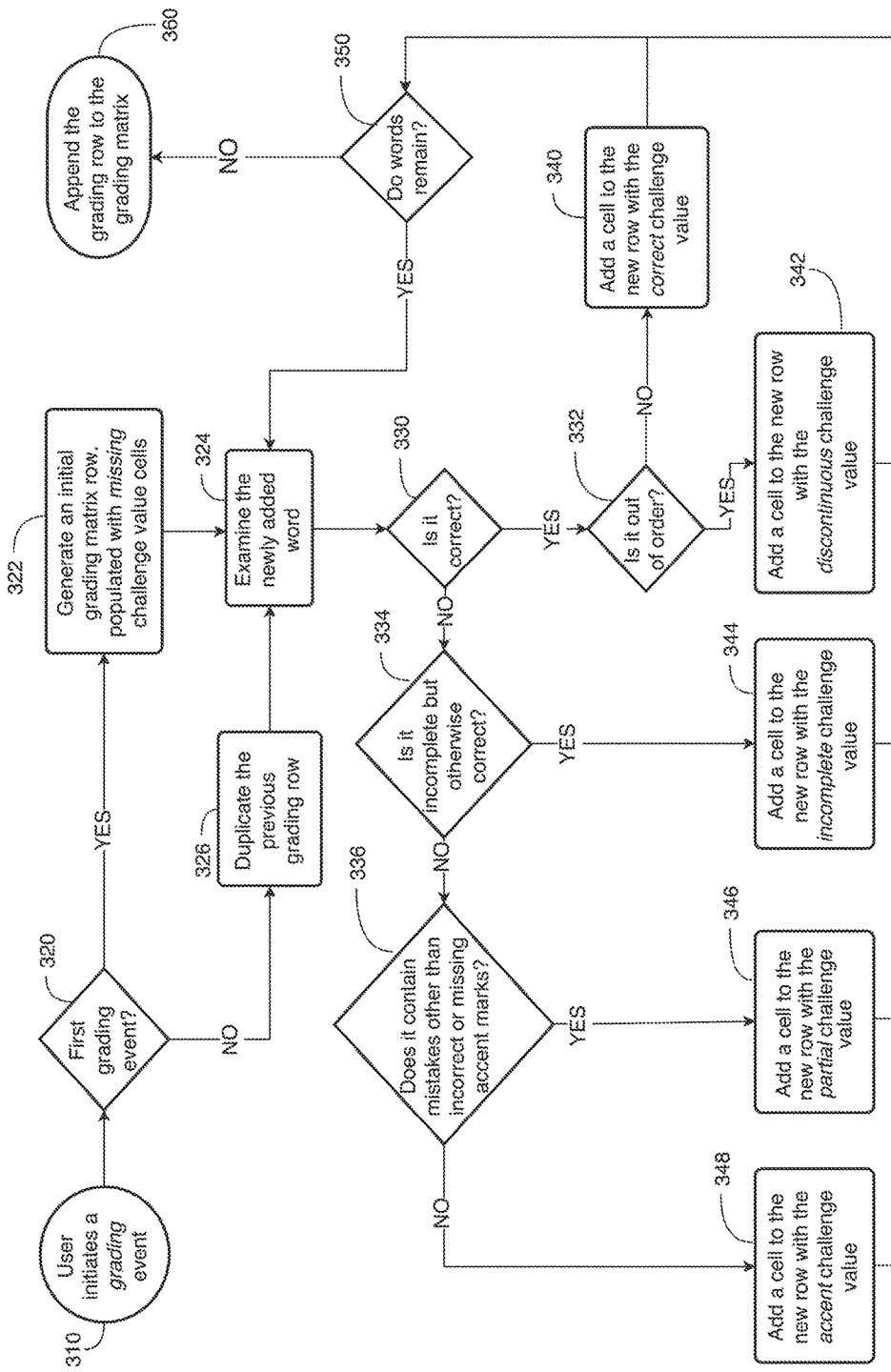
FIG. 3 is a flowchart of the scoring process, according to an exemplary embodiment of the invention.

In one embodiment, we can generate a series of "Scoring Weights" which may be computed based on the compiling of a grading matrix, generated while the user works on the transcription. Referring to FIG. 3, we show a grading process, and in Table 1 a grading matrix. The grading matrix consists of a column for each word in the passage, and a row for each grading event 310 during the dictation task. Note that grading events may occur when a word is finished, either by entering word-final punctuation or by pressing the spacebar. As each grading event occurs, a row is added to the grading matrix which contains a cell for each word in the dictated phrase. The cell indicating the modified word is populated with a value corresponding to the edit state of the event. The possible edit states may include missing, partial, incomplete, discontinuous, accent, revealed, and correct.

A missing edit state indicates that the relevant word remains unattempted; partial means that some of the letters in the word are incorrect, but not all; incomplete applies to a word that contains only correct letters, but is still missing some; discontinuous refers to a completely correct word that does not immediately follow the last word that was entered; accent occurs when the only mistakes in a word are mistaken use (or absence) of an accent mark; correct refers to a correctly entered word, input with no mistakes. The revealed edit state refers to a word revealed or completed by the use of a "reveal"—in some embodiments, "reveals" may be available, e.g. there may be buttons present in the user interface which, when pressed, reveal a missing word or character. These reveals may be consumable—each caption may have a limited number of reveals available. For instance, there may be one reveal for every three words in the caption.

When the first grading event occurs 320, a new row is created for the grading matrix and filled with cells indicating that all the words in the dictated phrase are missing 322. This row is then modified to reflect the edit state of each word. The first newly added word is examined 324 for correctness 330. If it is correct, a determination is made whether or not the word was entered in the correct order 332. If the word was correct and in the correct order, the cell corresponding to the word is populated with the correct edit value 340. If it is correct, but out of order, the discontinuous edit value is used 342 (so that even if said 'discontinuity' is not shown, the system still records that fact that a word was entered correctly, albeit out of sequence). Note that in one embodiment, even if we do not "show" discontinuity of input to the user with any form of unique visual feedback (other than insertion points for missing words)—we will still record the fact that a word was entered correctly but out of sequence, e.g. words were skipped.

If the word was not correct, but there are no incorrect letters 334, an incomplete edit value is inserted 344. If it was neither correct nor incomplete (i.e. there are mistakes in the word) and there are only accent mistake (or other similar 'special' marks like tilde over an n (ñ), umlaut (ü) and other similar symbols) 336, an accent edit value is used 348. Otherwise, the word has mistakes, and a partial edit value is inserted 346. If there are additional new words added since the last grading event 350, this edit state evaluation repeats for the cell(s) corresponding to the other new words(s). Otherwise, the newly constructed row is added to the grading matrix 360. For each subsequent grading event a new row is created by duplicating 326 the most recent row of the grading matrix, and the input is evaluated using the same process as above, beginning at 324, and then added to the matrix.

Imagine a user types "Mary has lamb," three grading events are triggered, one for each word entered. These three grading events are represented in the first three rows of Table 1 as Grading Event 1, Grading Event 2, and Grading Event 3. During Grading Event 1 it was determined that "Mary" is correct. During Grading Event 2 it was determined that "has" is partial (partially correct/has mistakes). During Grading Event 3 it was determined that "lamb" is correct but was input in a discontinuous order (skipping words).

The subsequent three rows of Table 1 represent Grading Events 4 through 6. The user has corrected "has" to read "had," triggering Grading Event 4 with the new edit state correct for the word "had." The user then reveals the word "a" by using a "reveal", triggering Grading Event 5, wherein the word "a" is recorded as having the edit state revealed. Finally, the user adds the missing word "little," triggering Grading Event 6 with a correct edit state recorded for the word.

The final resulting matrix is shown in full in Table 1. The italicized cell in each row reflects the edit state corresponding to the change which occurred during the grading event. The grading matrix may be used to produce a "challenge" score, indicating how difficult the exercise was for the learner. In order to convert the grading matrix into a numeric score, each of the edit states is assigned a value reflecting how much of a challenge it represented to the learner. The sum of edit values for a given word (a column of the grading matrix) amounts to the "challenge value" for that word, as shown in the final row of Table 1.

The challenge values of each word are then averaged to give a challenge score for the phrase. Given example edit values of 0 for correct, 0.01 for missing, 0.25 for discontinuous, 1.0 for partial, 2.0 for revealed edit states, the above scenario would be given a challenge score of (0+2.01+2.04+0.05+0.27)/5=0.874, a middle range score, indicating that the exercise was fairly challenging. A perfect answer on this exercise would have a challenge score of (0+0.01+0.02+0.03+0.04)/5=0.02.

In one embodiment, there may be a general grading key, e.g. 0.05 to 0.2 may be classified as a "Low challenge", 0.2 to 1 as a "Medium challenge", 1 to 1.5 as "Hard challenge" and anything over 1.5 be classified as "Extremely Hard challenge".

TABLE 1

|  | Mary | had | a | little | lamb |
| --- | --- | --- | --- | --- | --- |
| Grading Event 1 | correct (0) | missing (0.01) | missing (0.01) | missing (0.01) | missing (0.01) |
| Grading Event 2 | correct (0) | partial (1.0) | missing (0.01) | missing (0.01) | missing (0.01) |
| Grading Event 3 | correct (0) | partial (1.0) | missing (0.01) | missing (0.01) | discont. (0.25) |
| Grading Event 4 | correct (0) | correct (0) | missing (0.01) | missing (0.01) | correct (0) |
| Grading Event 5 | correct (0) | correct (0) | revealed (2.0) | missing (0.01) | correct (0) |
| Grading Event 6 | correct (0) | correct (0) | correct (0) | correct (0) | correct (0) |
| Challenge Value | 0 | 2.01 | 2.04 | 0.05 | 0.27 |

Other factors may also be included in determining the challenge value (word level) and/or challenge score (phrase level) calculation, such as number of keystrokes to completion, time to completion, the number of times the user repeated the audio, and the use of aids and hints such as translation or slow play and the like. Other scores may be calculated in addition to the exercise challenge value and/or exercise challenge score, such as a "completion score," simply measuring the number of words completed without the use of a reveal. Any of these scores may be used alone or in conjunction to determine future tasks and to indicate a user's progress and/or proficiency either to the user or to someone else, such as a teacher or test giver.

All of the above mentioned aspects may persist through subsequent visits by the user to the same exercise until they complete the exercise. That is, the user may move to a new question, then return later, and the challenge score modifications will accumulate.

It may be of notice to those skilled in the art that there are many possible variations to the embodiments described above. The information about correct, incorrect, misplaced, and missing characters, as well as the time to complete, can provide for many other specific grading methods and calculations, possibly with weightings appropriate for a specific embodiment.

In one embodiment, feedback is updated upon each keystroke. In another embodiment, feedback is updated upon each character entry that signifies word completion, such as a space, a comma, a period, a question mark, a semicolon, a colon, or an exclamation point. This latter variation may be less distracting to the student than the display changing after every character. In another embodiment, the system may otherwise "monitor" each letter as it is input in relation with previously input letters and autonomously trigger a grading event when enough data is present to give the user accurate and meaningful feedback. In another embodiment, feedback may be the same as the embodiment above with the addition of an update after a period of inactivity, for example 15 seconds.

In one embodiment the exercise might present a continuous program (for example a story, or a TV show, or radio story) as a series of dictation exercises. As the student progresses, she is taken through the program. One class of alternate embodiments involves "gamification." For example, clues in the form of "hangman" representation and visible scoring that displays "game currency" (e.g. points). The currency might used to "buy" access clues/hints.

Another whole class of alternate embodiments involves the display. There can be a feedback area distinct from the input box, or video or still images may complement the audio presentation and provide visual hints. A wide variety of visual hints may be used including showing part, or all, of the passage in a second language; allowing the student to slow the audio; and providing a number of "free words" or "free letters."

Note that the audio may be presented to the user via speakers or headsets (both wired and wireless), as part of a video and in any other form or module that would be functional to the user's hearing.

Another class of alternate embodiments involve vocal input, rather than text input, by the student using a system microphone. Voice recognition converts the spoken input to text, which is compared against the correct passage in the same manner as text input.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A dynamically scored dictation transcription system having dynamic feedback and scoring, said system comprising:
   a memory;
   at least one hardware processor interoperably coupled with said memory;
   audio playing module;
   an operator interface module providing a facility for the continuous real-time historical tracking and logging and time stamping of entries of commands, letters or characters by a particular user over time regardless of said text correctness, including user typing speed; and a calculation module for performing a calculation that includes the display of said entered entries as well as the display of various indicia designating correct letters, incorrect letters missing letters and/or words/characters in said entered text over time.

2. The system of claim 1 wherein;
said calculation module includes the calculation of the individual data elements of a grading event matrix calculation based upon the timeliness and accuracy factors of said user entered data, user initiated actions or system events;
said logging and time stamping includes at least one of:
user entries, commands and annotations, including corrections, type of correction, any user requested hints or other system help/aid and/or the specific time at which the correction/system aid occurred; and
generating and/or updating the data elements of the exercise challenge score in real-time.

3. The system of claim 2 wherein;
each individual user action history is comprised of one or more time stamped:
student initiated actions, inputs, deletions, corrections, errors (including whether partial or complete), type and number of requests for system correction/aid and/or word completions;
said scoring system makes differentially weighted use of said unique and discrete data when generating student feedback, grade or challenge score; and
said calculation module generates said exercise challenge score, including the values of each said individual data element of said grading event matrix, after every user character input.

4. The system of claim 3 wherein;
said individual data elements of said grading event matrix include at least one of: correct, missing, discontinuous, partial, revealed, number of keystrokes to completion, number of times the user repeated the audio, use of aids, use of hints and/or time to completion; and
the type of errors is comprised of one or more of:
complete errors, partial errors or combinations thereof.

5. The system of claim 4 wherein;
said type of requests for system correction/aid is comprised of one or more of:
repeat audio, repeat with slow play, make translation visible, revealed letters, character correction upon request and/or accent problem fixed upon request.

6. The system of claim 4 wherein;
correct letters that are in proper sequence with respect to each other and with respect to other correct letters are shown as correct in the feedback regardless of whether any preceding letters are missing or not.

7. The system of claim 2 wherein;
said calculation module generates said exercise challenge score, including the values of each said individual data element of said grading event matrix after every word input.

8. The system of claim 7 wherein;
said individual data elements of said grading event matrix include at least one of: correct, missing, discontinuous, partial, revealed, number of keystrokes to completion, number of times the user repeated the audio, use of aids, use of hints and/or time to completion.

9. The system of claim 8 wherein;
correct letters that are in proper sequence with respect to each other and with respect to other correct letters are shown as correct in the feedback regardless of whether any preceding letters are missing or not.

10. A computer-implemented method for dynamically scored dictation transcription with dynamic feedback and scoring, performed by one or more processors, the computer-implemented method comprising:
providing, by the one or more processors, audio through a sound playing module;
providing, by the one or more processors, an operator interface module facility for the continuous real-time historical tracking and logging and time stamping of entries of commands, letters or characters by a particular user over time regardless of said text correctness, including user typing speed; and
providing, by the one or more processors, a calculation module for performing a calculation of the display of said entered entries as well as the display of various indicia designating correct letters, incorrect letters missing letters and/or words/characters in said entered text over time.

11. The method of claim 10 wherein;
said calculation module includes the calculation of the individual data elements of a grading event matrix calculation based upon the timeliness and accuracy factors of said user entered data, user initiated actions or system events;
said logging and time stamping includes at least one of:
user entries, commands and annotations, including corrections, type of correction, any user requested hints or other system help/aid and/or the specific time at which the correction/system aid occurred; and
generating and/or updating the data elements of the exercise challenge score in real-time.

12. The method of claim 11 wherein;
each individual user action history is comprised of one or more time stamped:
student initiated actions, inputs, deletions, corrections, errors (including whether partial or complete), type and number of requests for system correction/aid and/or word completions;
said scoring system makes differentially weighted use of said unique and discrete data when generating student feedback, grade or challenge score; and
said calculation module includes the calculation of the individual data elements of a grading event matrix calculation based upon the timeliness and accuracy factors of said user entered data.

13. The method of claim 12 wherein;
said type of requests for system correction/aid is comprised of one or more of:
repeat audio, repeat with slow play, make translation visible, revealed letters, character correction upon request and/or accent problem fixed upon request.

14. The method of claim 12 wherein;
said individual data elements of said grading event matrix include at least one of: correct, missing, discontinuous, partial, revealed, number of keystrokes to completion, number of times the user repeated the audio, use of aids, use of hints and/or time to completion; and
the type of errors is comprised of one or more of:
complete errors, partial errors or combinations thereof.

15. The method of claim 14 wherein;
correct letters that are in proper sequence with respect to each other and with respect to other correct letters are shown as correct in the feedback regardless of whether any preceding letters are missing or not.

16. The method of claim 11 wherein;
said calculation module generates said exercise challenge score, including the values of each said individual data element of said grading event matrix, after every user word input.

17. The method of claim 16 wherein;
said individual data elements of said grading event matrix include at least one of: correct, missing, discontinuous, partial, revealed, number of keystrokes to completion, number of times the user repeated the audio, use of aids, use of hints and/or time to completion.

18. The method of claim 17 wherein;
correct letters that are in proper sequence with respect to each other and with respect to other correct letters are shown as correct in the feedback regardless of whether any preceding letters are missing or not.

19. A computer-implemented method of presenting a dictation transcription exercise performed by one or more processors, the computer-implemented method comprising:
playing by the one or more processors, a pre-recorded audio passage,
accepting by the one or more processors, input while providing continuous real-time historical tracking and logging and time stamping of entries of commands, letters or characters by a particular user over time regardless of said text correctness, including user typing speed;
displaying by the one or more processors, the display of said entered entries of a particular user over time with indicia of correct letters, incorrect letters missing letters and/or words/characters in said entered text over time;
where the accepting of said entries over time is not affected by erroneous transcription.

20. The method of claim 19 wherein:
said indicia includes characters of more than one color.

21. The method of claim 19 further comprising:
the display of visual hints other than correct characters in the language of the exercise.

22. The method of claim 19 further comprising:
recording as data all changes in input and generating/updating an exercise challenge score based on such data upon the detection of any change in input in real time; and
said logging and time stamping includes at least one of:
user entries, commands and annotations, including corrections, type of correction, any user requested hints or other system help/aid and/or the specific time at which the correction/system aid occurred;
each individual user action history is comprised of one or more time stamped:
student initiated actions, inputs, deletions, corrections, errors (including whether partial or complete), type and number of requests for system correction/aid and/or word completions;
each individual user action history is comprised of one or more time stamped:
student initiated actions, inputs, deletions, corrections, errors (including whether partial or complete), type and number of requests for system correction/aid and/or word completions;
said scoring system makes differentially weighted use of said unique and discrete data when generating student feedback, grade or challenge score; and
said calculation module generates said exercise challenge score, including the values of each said individual data element of said grading event matrix, after every user character input.

* * * * *